(12) United States Patent
Galluzzi

(10) Patent No.: US 10,998,705 B2
(45) Date of Patent: May 4, 2021

(54) SMART SWITCH FACEPLATE

(71) Applicant: SmartPlate LLC, Marilla, NY (US)

(72) Inventor: Carmen Galluzzi, Marilla, NY (US)

(73) Assignee: SmartPlate LLC, Marilla, NY (US)

( * ) Notice: Subject to any disclaimer, the term of this patent is extended or adjusted under 35 U.S.C. 154(b) by 141 days.

(21) Appl. No.: 16/368,174

(22) Filed: Mar. 28, 2019

(65) Prior Publication Data

US 2019/0312422 A1 Oct. 10, 2019

Related U.S. Application Data

(60) Provisional application No. 62/652,644, filed on Apr. 4, 2018.

(51) Int. Cl.
*H02G 3/14* (2006.01)

(52) U.S. Cl.
CPC ...................................... *H02G 3/14* (2013.01)

(58) Field of Classification Search
CPC ..... H02G 3/14; H02G 3/18; H02G 3/081; H02G 3/12; H02G 3/088; H02G 3/085; H05K 5/03; H05K 5/02; H05K 5/00
USPC ........... 174/66, 67, 50, 53, 57, 480, 481, 58; 220/3.2–3.9, 4.02, 241, 242
See application file for complete search history.

(56) References Cited

U.S. PATENT DOCUMENTS

| | | | |
|---|---|---|---|
| 2,002,491 A | 5/1935 | Despard | |
| 4,835,343 A | 5/1989 | Graef et al. | |
| 5,180,886 A | 1/1993 | Dierenbach et al. | |
| 5,594,206 A * | 1/1997 | Kias | H01H 9/18 174/56 |
| 5,875,940 A | 3/1999 | Mayfield | |
| 5,998,747 A * | 12/1999 | Kelso | H01H 23/148 174/66 |
| 6,566,602 B1 * | 5/2003 | Miller | H02G 3/121 174/66 |
| 6,593,530 B2 * | 7/2003 | Hunt | H01H 9/18 174/66 |
| 7,030,319 B2 * | 4/2006 | Johnsen | H02G 3/14 174/66 |
| 7,183,487 B1 * | 2/2007 | O'Young | H02G 3/14 174/66 |
| 7,456,358 B2 | 11/2008 | Swiencicki et al. | |
| 7,475,559 B2 | 1/2009 | Gleeson | |
| 7,622,676 B2 | 11/2009 | Drane et al. | |
| 8,058,570 B2 * | 11/2011 | Solan | H02G 3/123 174/502 |
| 8,063,302 B1 * | 11/2011 | Gretz | H02G 3/123 174/58 |
| 8,148,637 B2 * | 4/2012 | Davidson | H02G 3/14 174/66 |
| 9,559,505 B2 | 1/2017 | Gage | |
| 9,698,584 B2 | 7/2017 | Shotey | |
| 2007/0272532 A1 | 11/2007 | Pessina et al. | |

(Continued)

*Primary Examiner* — Angel R Estrada
(74) *Attorney, Agent, or Firm* — Simpson & Simpson PLLC

(57) ABSTRACT

A switch faceplate having a body, an aperture arranged within the body, a first tab arranged within the aperture, and a first protrusion extending from the first tab. The protrusion is operatively arranged to receive a fastener. The faceplate is operatively arranged to secure a smart switch or a mounting bracket for the smart switch.

13 Claims, 4 Drawing Sheets

(56) References Cited

U.S. PATENT DOCUMENTS

2016/0055996 A1  2/2016  Quezada
2017/0146730 A1  5/2017  O'Keeffe

\* cited by examiner

SMART SWITCH FACEPLATE

CROSS REFERENCE TO RELATED APPLICATIONS

This application claims benefit under 35 U.S.C. § 119 of U.S. Provisional Patent Application No. 62/652,644, filed Apr. 4, 2018, which application is incorporated herein by reference in its entirety.

FIELD

The disclosure relates to electrical outlet faceplate covers, more specifically, to a plate cover/switch plate adapted to accept a smart switch.

BACKGROUND

Wall-mounted electrical devices such as switches or rockers are typically mounted within electrical outlet gang boxes. These electrical outlet gang boxes come in a variety of lengths depending on the number of switches or rockers they are designed to house. For instance, a single gang box fits one switch or rocker, a double gang box fits two switches or rockers, a triple gang box fits three switches or rockers, and so on. In both commercial and residential settings, many property owners are electing to replace their series of switches or rockers within multi-gang box arrangements with a single smart switch. These smart switches can perform a number of functions a traditional switch or rocker cannot, and many smart switches are used to consolidate multiple electric circuits. In such cases, a single smart switch is effectively replacing several switches or rockers.

When sold, most retail smart switches come with an adaptor plate or mounting bracket, which is designed to engage with a standard single-gang wall box and the smart switch. If a user wishes to replace a multi-gang wall box arrangement with a single smart switch, the plate provided is insufficient to cover-up the other exposed wall boxes of the multi-gang arrangement. This creates both an unsightly and potentially hazardous scenario, where the majority of the interior of the multi-gang box and the electric circuitry housed within are visible and accessible. To avoid this unsightly and dangerous situation, users may need to replace drywall or paneling, or take on other large scale projects to alter their property.

Thus, there is a long-felt need for a smart switch faceplate capable of engaging with a multi-gang wall box. There is a long-felt need for a smart switch faceplate that can surround a single smart switch and cover any unused wall boxes of a multi-gang wall box.

SUMMARY

According to aspects illustrated herein, there is provided a switch faceplate, comprising a body, an aperture arranged within the body, a first tab arranged within the aperture, and a first protrusion extending from the first tab. The protrusion is operatively arranged to receive a fastener. The faceplate is operatively arranged to secure a smart switch or a mounting bracket for the smart switch. The faceplate may include a plurality of through-bores that receive fasteners, securing the faceplate to a gang box. The at least one protrusion may feature a partial through-bore to receive a fastener, securing a mounting bracket to the faceplate. A smart switch may lock into the mounting bracket and sit within the aperture.

A primary object of the disclosure is to provide a switch faceplate design that can fit multi-gang wall boxes.

Another object of the disclosure is to provide a switch faceplate that can secure a single mounting bracket or smart switch while concealing any unused wall boxes.

These and other objects, features, and advantages of the present disclosure will become readily apparent upon a review of the following detailed description of the disclosure, in view of the drawings and appended claims.

BRIEF DESCRIPTION OF THE SEVERAL VIEWS OF THE DRAWINGS

Various embodiments are disclosed, by way of example only, with reference to the accompanying schematic drawings in which corresponding reference symbols indicate corresponding parts, in which.

DETAILED DESCRIPTION OF EMBODIMENTS

At the outset, it should be appreciated that like drawing numbers on different drawing views identify identical, or functionally similar, structural elements. It is to be understood that the claims are not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the claims.

Unless defined otherwise, all technical and scientific terms used herein have the same meaning as commonly understood to one of ordinary skill in the art to which this disclosure pertains. It should be understood that any methods, devices or materials similar or equivalent to those described herein can be used in the practice or testing of the example embodiments. The assembly of the present disclosure could be driven by hydraulics, electronics, pneumatics, and/or springs.

It should be appreciated that the term "substantially" is synonymous with terms such as "nearly," "very nearly," "about," "approximately," "around," "bordering on," "close to," "essentially," "in the neighborhood of," "in the vicinity of," etc., and such terms may be used interchangeably as appearing in the specification and claims. It should be appreciated that the term "proximate" is synonymous with terms such as "nearby," "close," "adjacent," "neighboring," "immediate," "adjoining," etc., and such terms may be used interchangeably as appearing in the specification and claims. The term "approximately" is intended to mean values within ten percent of the specified value.

Moreover, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element.

Figure 1:
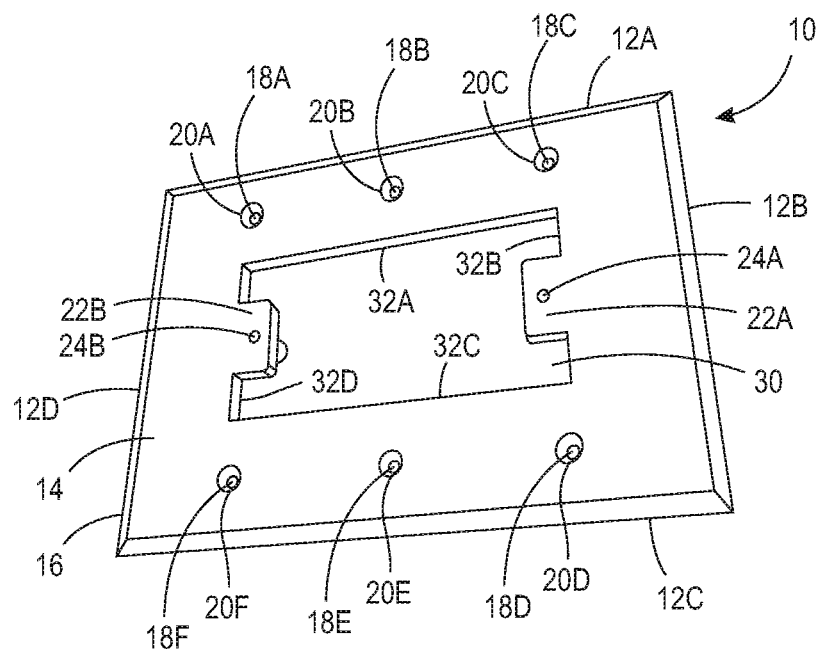
FIG. 1 is a front perspective view of a smart switch faceplate.

FIG. 1 is a front perspective view of electrical outlet faceplate 10 of the present disclosure. Faceplate 10 is depicted as rectangular in shape. However, it should be appreciated that the present disclosure could take on any number of shapes and sizes strategically chosen to fit a wall outlet of any number of potential shapes or sizes. As depicted in FIG. 1, faceplate 10 comprises beveled edges 12A, 12B, 12C, and 12D. Beveled edges 12A-12D form a perimeter around the body of faceplate 10. The body of faceplate 10 includes top surface 14 and bottom surface 16. While beveled edges 12A-12D are designed to provide a smooth transition between top surface of body 14 of faceplate 10 and the wall surrounding the electrical outlet, it should be appreciated by one having ordinary skill in the art that any number of edge designs can be used in conjunction with faceplate 10. For instance, edges 12A-12D could just as easily be non-beveled edges, making right angles with the wall surrounding the electrical outlet, or edges 12A-12D could be rounded.

Figure 5:
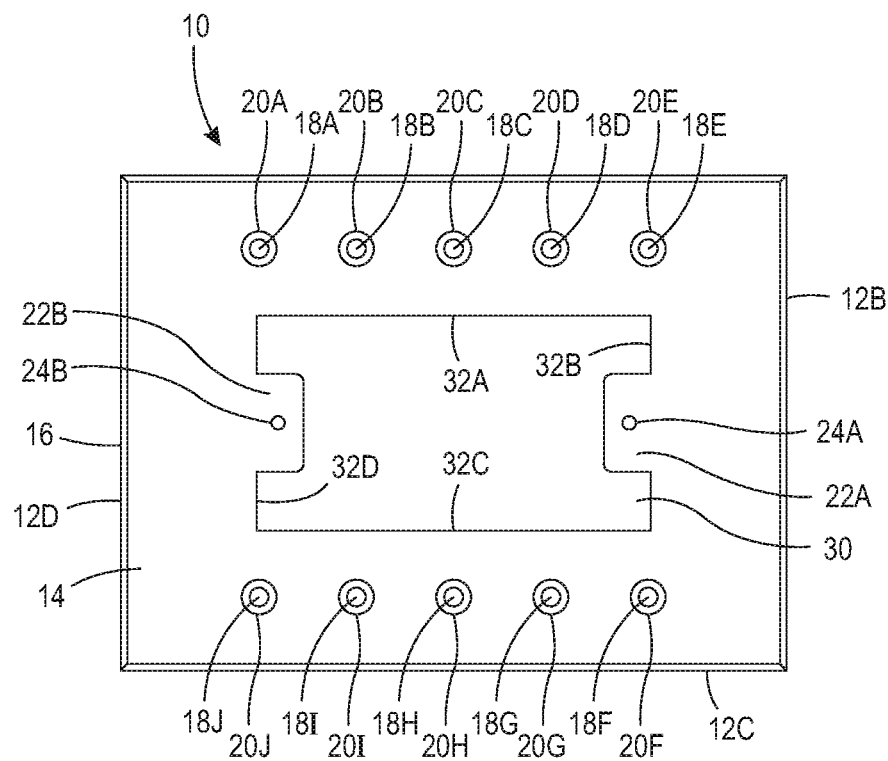
FIG. 5 is a front view of the smart switch faceplate.
Figure 6:
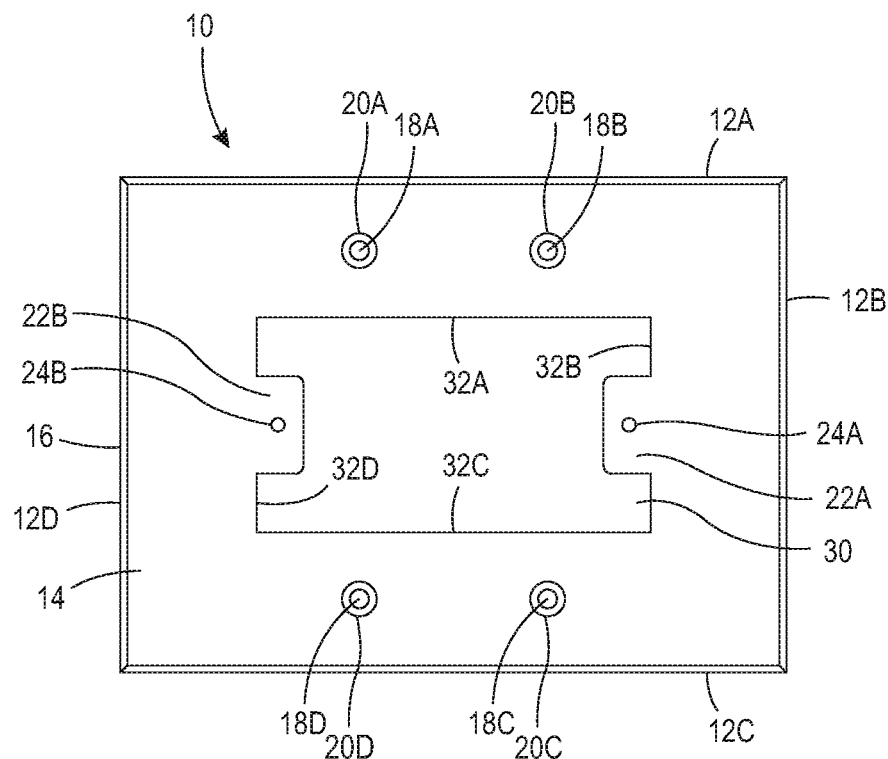
FIG. 6 is a front view of the smart switch faceplate.

Still adverting to FIG. 1, top surface of body 14 of faceplate 10 comprises through-bores 18A-18F. Through-bores 18A-18F allow for faceplate 10 to be secured to an electrical outlet gang box. Any number of fasteners, such as screws or nails, could be inserted into through-bores 18A-18F to secure faceplate 10 to an electrical outlet gang box. Through-bores 18A-18F include countersinks 20A-20F. Countersinks 20A-20F allow the fasteners inserted through through-bores 18A-18F to sit flush with top surface 14. As an alternative, counterbores can be used in place of countersinks 20A-20F. Counterbores would predominantly perform the same function as countersinks, allowing the fasteners inserted through through-bores 18A-18F to sit flush with or below top surface 14 as desired. Faceplate 10 can comprise any number of through-bores. The number of through-bores can be operatively chosen and arranged to fit electrical outlet gang boxes of different sizes. The number of through-bores can scale with the size of the electrical outlet gang box the particular faceplate 10 is being designed to cover. For instance, faceplate 10 designed to cover a quadruple gang box would feature more through-bores than faceplate 10 designed to cover a triple gang box. Furthermore, faceplate 10 designed to cover a triple gang box would feature more through-bores than faceplate 10 designed to cover a double gang box. FIG. 5, for instance depicts faceplate 10 comprising through-bores 18A-18J and countersinks 20A-20J. Faceplate 10 in FIG. 5 may be operatively arranged to be secured to a quintuple gang box. In contrast, adverting to FIG. 6, faceplate 10 is depicted comprising through-bores 18A-18D and countersinks 20A-20D. Faceplate 10 in FIG. 6 may be operatively arranged to be secured to a double gang box. It should be appreciated that the number of through-bores featured on faceplate 10 and the spacing and placement of through-bores can be altered to operatively fit any number of sizes and styles of available gang boxes. It follows that the length of faceplate 10, also, scales to fit gang boxes of different sizes. Faceplate 10 designed for a quadruple gang box will be longer than faceplate 10 to fit a double gang box. Faceplate 10 can be any length to fit any desired gang box size.

Adverting again to FIG. 1, faceplate 10 comprises center aperture 30. Center aperture 30 is bordered by edges 32A-32D. As depicted in FIG. 1, center aperture 30 is largely rectangular. However, it should be appreciated that center aperture 30 can take on any number of shapes to accommodate a smart switch or mounting bracket of any shape. Tabs 22A and 22B extend into the interior of center aperture 30 from edges 32B and 32D, respectively. Tabs 22A and 22B are centered on edges 32B and 32D, respectively. The midpoints of tabs 22A and 22B are collinear. Tabs 22A and 22B include partial through-bores 24A and 24B, respectively. It should be appreciated by one having ordinary skill in the art that full through-bores could be used in the place of partial through-bores. Additionally, it should be appreciated that while tabs 22A and 22B are depicted as largely rectangular, tabs 22A and 22B can take on any shape and perform the same function. The length and size of tabs 22A and 22B can be altered to accommodate any changes in the length and size of available mounting brackets and smart switches.

Figure 3:
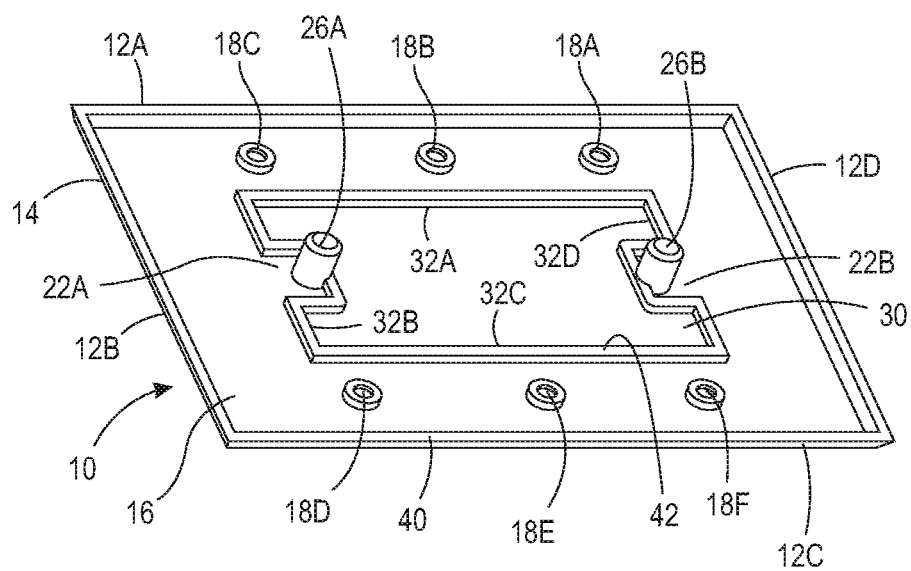
FIG. 3 is a rear perspective view of the smart switch faceplate.

FIG. 3 depicts a rear perspective view of faceplate 10. Faceplate 10 comprises protrusions 26A and 26B, which extend from bottom surface 16 of tabs 22A and 22B, respectively. As depicted, protrusions 26A and 26B are largely cylindrical. However, protrusions 26A and 26B can take on any number of shapes. For instance, protrusions 26A and 26B could be rectangular or octagonal.

Figure 2:
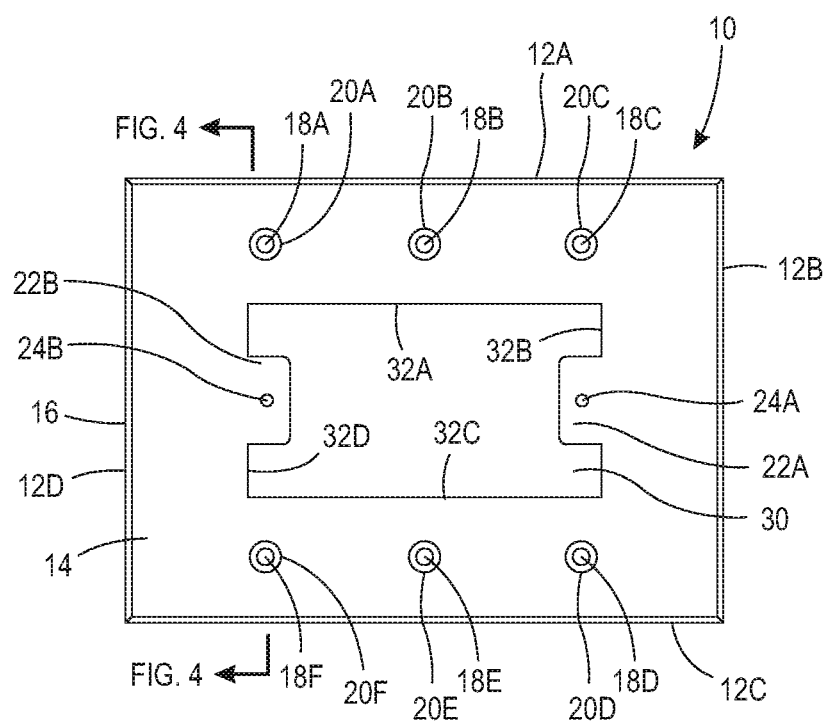
FIG. 2 is a front view of the smart switch faceplate.
Figure 4:
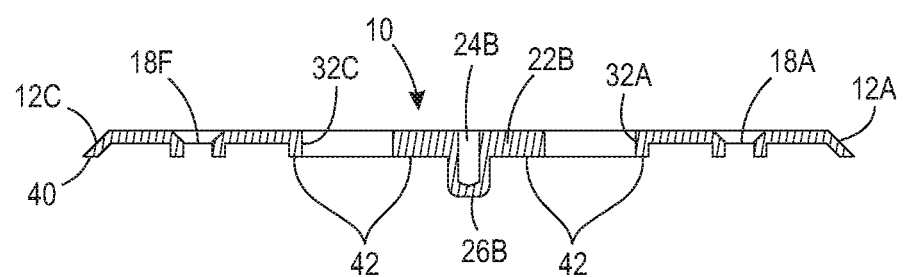
FIG. 4 is a cross-sectional view of the smart switch faceplate.

FIG. 4 depicts a cross-sectional view of faceplate 10 about the line 4-4 designated in FIG. 2. Tab 22B and protrusion 26B share partial through-bore 24B. Partial through-bores 24A and 24B are designed to receive a fastener such as a screw or nail. Partial through-bores 24A and 24B can be threaded or unthreaded. Faceplate 10 comprises bottom outer perimeter 40, formed by edges 12A-12D. Faceplate 10, also, comprises bottom inner perimeter 42, formed by edges 32A-32D.

Figure 7:
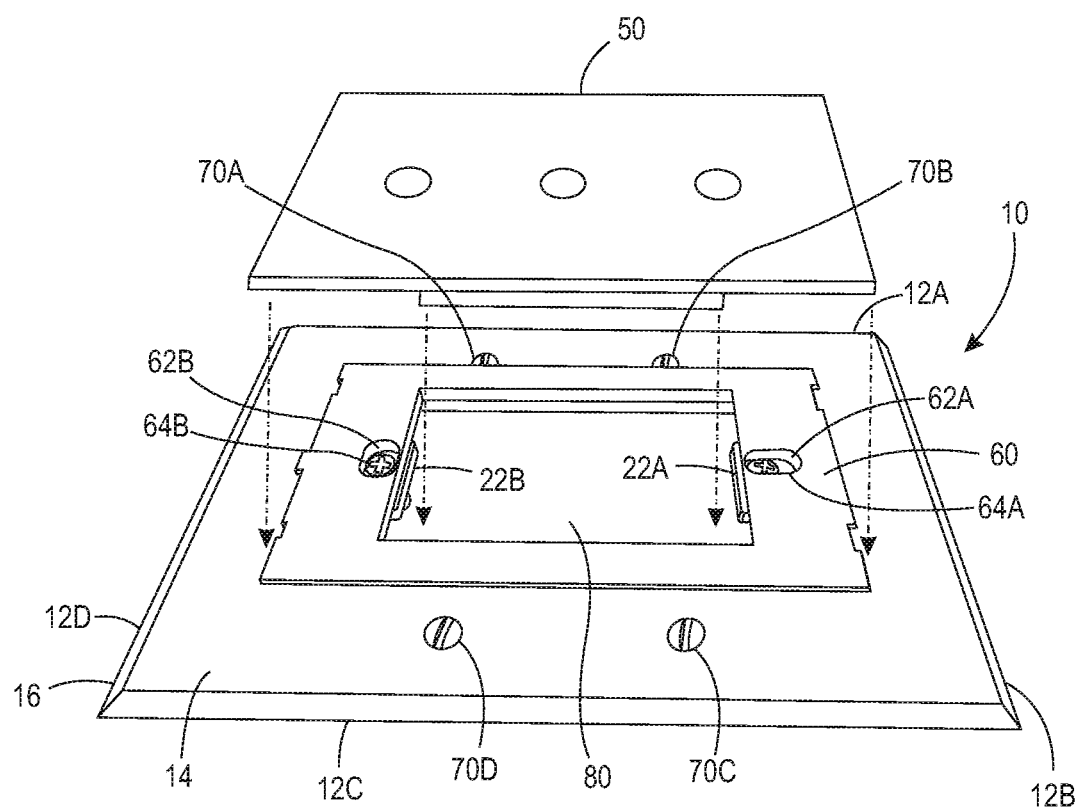
FIG. 7 is a front perspective view of the smart switch faceplate engaging a mounting bracket and smart switch.

FIG. 7 depicts a front perspective view of faceplate 10 engaging mounting bracket 60 and smart switch 50. Faceplate fasteners 70A-70D can include any common type of fasteners, including screws or nails. Faceplate fasteners 70A-70D are inserted through through-bores 18A-18D, securing faceplate 10 to the electrical outlet gang box. Mounting bracket 60 is shown secured to top surface 14 of faceplate 10. Mounting bracket 60 comprises cavities 62A and 62B. Bracket fasteners 64A and 64B secure mounting bracket 60 to top surface 14 by being inserted through cavities 62A and 62B, which overlap partial through-bores 24A and 24B, respectively. Bracket fasteners 64A and 64B are further inserted through tabs 22A and 22B and into protrusions 26A and 26B. Bracket fasteners 64A and 64B can include any number of common fasteners, including screws and nails. Mounting bracket 60 overlaps tabs 22A and 22B, sitting atop center aperture 30, and creating aperture 80. Mounting bracket 60 provides means to attach smart switch 50 to faceplate 10. The perimeter of smart switch 50 snaps into mounting bracket 60. The body of smart switch 50 sits within aperture 80. It should be appreciated that smart switch 50 and mounting bracket 60 are sold together, but separately from the present disclosure. Center apertures 30 and 80 can take on any number of shapes and sizes to accommodate the shape of available smart switches and mounting brackets.

It will be appreciated that various aspects of the disclosure above and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

REFERENCE NUMERALS 10 faceplate
12A edge
12B edge
12C edge
12D edge
14 top surface of body
16 bottom surface of body
18A through-bore
18B through-bore
18C through-bore
18D through-bore
18E through-bore
18F through-bore
18G through-bore
18H through-bore
18I through-bore
18J through-bore
20A countersink
20B countersink
20C countersink
20D countersink
20E countersink
20F countersink
20G countersink
20H countersink
20I countersink
20J countersink
22A tab
22B tab
24A partial through-bore
24B partial through-bore
26A protrusion
26B protrusion
30 aperture
32A edge
32B edge
32C edge
32D edge
40 bottom outer perimeter
42 bottom inner perimeter
50 smart switch
60 mounting bracket
62A cavity
62B cavity
64A bracket fastener
64B bracket fastener
70A faceplate fastener
70B faceplate fastener
70C faceplate fastener
70D faceplate fastener
80 aperture

What is claimed is:

1. A switch faceplate, comprising:
   a body having a centrally arranged aperture;
   a first plurality of through-bores arranged co-linearly and leftwardly outside of said centrally arranged aperture along a first imaginary line;
   a second plurality of through-bores arranged co-linearly and rightwardly outside of said centrally arranged aperture along a second imaginary line, wherein said first and second imaginary lines are parallel to one another;
   a first tab arranged within the aperture; and,
   a first protrusion extending from the first tab;
   wherein the first protrusion is operatively arranged to receive a fastener; and,
   wherein the switch faceplate is operatively arranged to secure a smart switch or a mounting bracket for the smart switch.

2. The switch faceplate of claim 1, wherein each of the first plurality of through-bores and each of the second plurality of through-bores are arranged to receive a fastener.

3. The switch faceplate of claim 1, wherein the faceplate is secured to a gang box via said first plurality of through-bores and said second plurality of through-bores.

4. The switch faceplate of claim 1, wherein each of said first plurality of through-bores and each of said second plurality of through-bores further comprises a countersink.

5. The switch faceplate of claim 1, wherein the protrusion further comprises a partial through-bore.

6. The switch faceplate of claim 5, wherein the partial through-bore is threaded.

7. The switch faceplate of claim 5, wherein the partial through-bore is unthreaded.

8. The switch faceplate of claim 1, further comprising four beveled edges.

9. The switch faceplate of claim 1, wherein the protrusion extends from a bottom surface of the tab.

10. The switch faceplate of claim 1, wherein the protrusion is cylindrical.

11. The switch faceplate of claim 1, wherein the smart switch rests within the aperture.

12. The switch faceplate of claim 5, wherein the mounting bracket is secured to the faceplate via the partial through-bore.

13. The switch faceplate of claim 1, wherein the mounting bracket overlaps the tab.

* * * * *